US007824103B2

(12) United States Patent
Cresens

(10) Patent No.: US 7,824,103 B2
(45) Date of Patent: Nov. 2, 2010

(54) SCATTER-POOR DOSIMETER SUPPORT DEVICE AND METHOD OF OPERATION

(75) Inventor: Marc Cresens, Mortsel (BE)

(73) Assignee: AFGA Healthcare NV, Morstel (BE)

( * ) Notice: Subject to any disclaimer, the term of this patent is extended or adjusted under 35 U.S.C. 154(b) by 185 days.

(21) Appl. No.: 12/107,320

(22) Filed: Apr. 22, 2008

(65) Prior Publication Data

US 2008/0273667 A1    Nov. 6, 2008

Related U.S. Application Data

(60) Provisional application No. 60/914,070, filed on Apr. 26, 2007.

(51) Int. Cl.
*G21K 1/00* (2006.01)

(52) U.S. Cl. ..................................... 378/189
(58) Field of Classification Search ................ 378/189;
250/484.5, 337, 354.1, 358.1, 48.3
See application file for complete search history.

(56) References Cited

U.S. PATENT DOCUMENTS

| 3,813,712 | A | * | 6/1974 | Bonnin | ........................... | 5/625 |
| 6,097,033 | A | * | 8/2000 | Brand et al. | ............. | 250/484.3 |
| 2007/0183590 | A1 | * | 8/2007 | Gray | ........................... | 378/207 |

* cited by examiner

*Primary Examiner*—Irakli Kiknadze
(74) *Attorney, Agent, or Firm*—Houston Eliseeva, LLP

(57) ABSTRACT

An apparatus and method for an X-ray dosimeter support, comprises of a material-poor support-layer, held by a frame elevated by at least one foot, comprising optimization for low back-scatter, high measurement-repeatability and ease of assembly and disassembly.

20 Claims, 2 Drawing Sheets

SCATTER-POOR DOSIMETER SUPPORT DEVICE AND METHOD OF OPERATION

RELATED APPLICATIONS

This application claims the benefit under 35 USC 119(e) of U.S. Provisional Application No. 60/914,070, filed on Apr. 26, 2007, which is incorporated herein by reference in its entirety.

FIELD OF THE INVENTION

The present invention relates to quality assurance of radiography systems.

More specifically the invention relates to the measurement of the output of an X-ray source during acceptance testing and periodic image quality control testing on general radiography imaging equipment.

BACKGROUND OF THE INVENTION

The radiation detectors may be powder phosphor screens or needle image plates (needle IP), direct radiography detectors (amorphous silicon, amorphous selenium, Cmos (complimentary metal oxide), phosphor detector arranged for direct radiography etc.) or the like.

A radiation image is recorded on such a detector (also called 'plate') by exposing it to an x-ray field. The radiation image which is temporarily stored by the detector is read out in a read out system (also called 'digitizer'), where the exposed detector, is scanned with light of an appropriate wavelength and where the image-wise modulated light emitted by the detector upon stimulation is detected and converted into a digital image signal representative of the radiation image.

The signal to noise ratio (SNR) or normalized noise power spectrum ((N)NPS) of the image data must be analysed in order to evaluate the diagnostic capacity of the radiographic system for different uniform dose levels to be able to study its behaviour over the dynamic range.

Instead of using different detectors for each dose setting, a phantom target is used that contains a number of sub-targets each with a known absorption level for x-ray exposure.

Exposure of the detector then gives an image that contains the raw data needed for SNR or (N)NPS calculation. Every sub-target contains a region of interest (roi) with a known and constant attenuation for a known X-ray beam quality (energy spectrum) and is exposed to a uniform radiation field.

It is clear then that the output of the X-ray source must be exactly known, since it determines the radiation image that is used in the quality control testing of the SNR or the (N)NPS of the digitizer.

When a dosimeter is used to measure the output of an X-ray source, or during beam quality evaluation, the environment of the dosimeter ideally has to be free of surrounding material that would scatter the X-rays to the dosimeter and corrupt the measurement. This problem is normally solved by balancing the dosimeter on a web of thin wires, or using an assembly with a telescopic arm, in an attempt to keep scattering material as far away as possible from the dosimeter.

SUMMARY OF THE INVENTION

Current dosimeter systems usually work, but are clumsy, take time to configure, and have a low repeatability.

The current invention can be used for acceptance testing and periodic image quality control on general radiography imaging equipment to position the dosimeter for the determination of the "Radiation Quality Aluminium RQA 5 Tube Voltage" according to the IEC 61267 standardized measurement geometry and for input dose measurements.

The invention provides an apparatus and method for an X-ray dosimeter support, including a material-poor support-layer, held by a frame elevated by at least one leg or foot.

The support-layer, including a membrane, a perforated membrane, a fabric, or a mesh, is equipped with a detection-chamber alignment hole, and has detection-chamber or X-ray beam centering markers arranged on it.

The X-ray entry surface of the frame, or the sidewall of the frame facing the dosimeter (the X-ray exit surface), or both, are equipped with an X-ray shield.

The at least one leg of the apparatus is hollow, and inclined towards the X-ray source, and the frame is equipped with an X-ray shield above the at least one foot.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
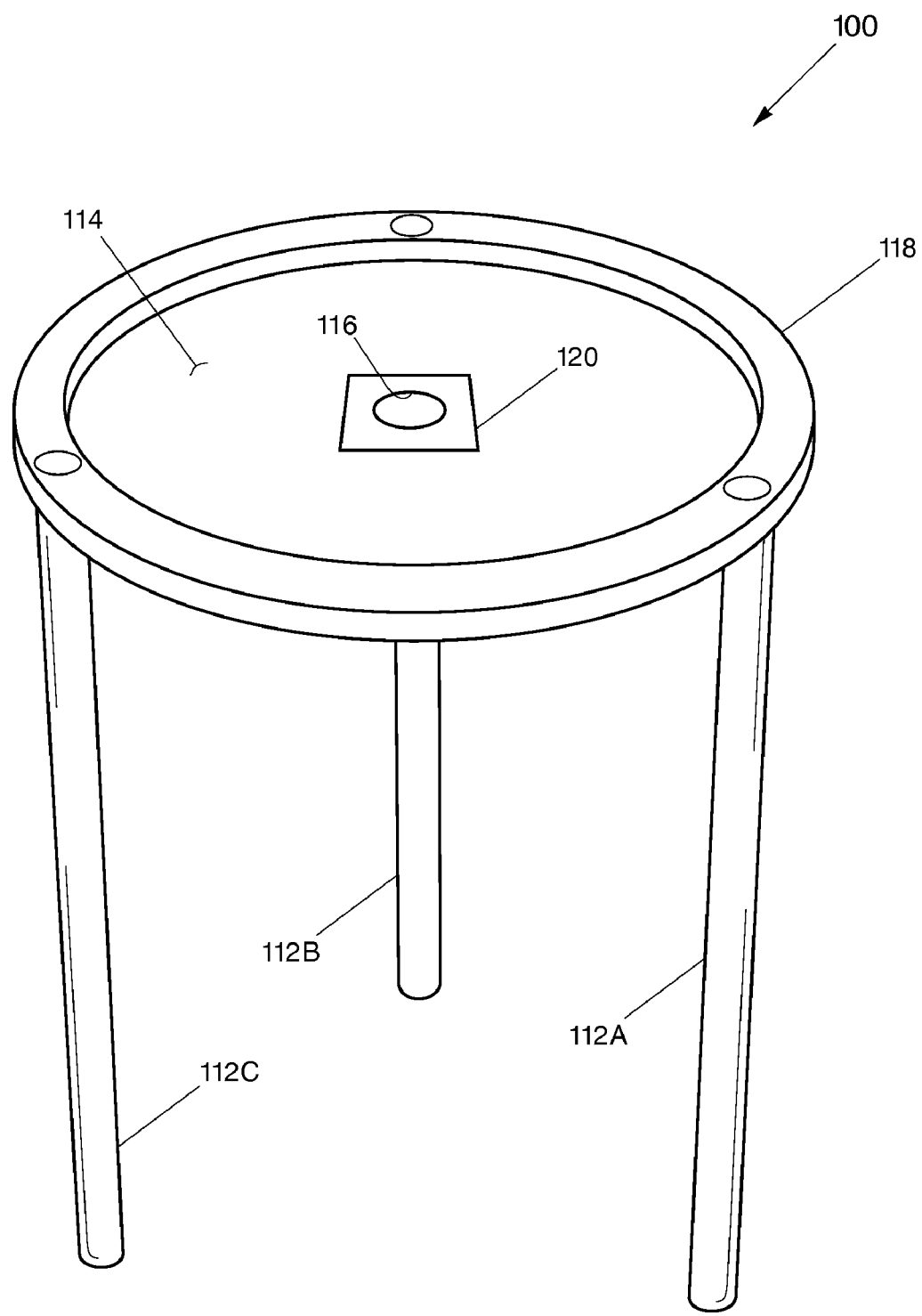
FIG. 1 is a perspective view of the X-ray dosimeter support according to one embodiment of the present invention.

FIG. 1 shows support device 100 with low back-scatter contribution that is easily put together and allows for a quick re-establishment of circumstances, with a high repeatability of the experiment as a result.

The support device 100 is stool-like with a frame 118 that is supported by at least one leg; preferably three legs 112A, 112B, 112C are provided, for stability. The "seat" of the support device 100 is a "tambourine skin" support layer 114 made of very thin tear-free material with a central hole 116 in it. The support layer 114 is stretched over the frame 118

In the current embodiment of the device 100, this support layer 114 is a non-perforated membrane. In other embodiments it could be a perforated membrane, a fabric, or a mesh. As a matter of fact, any material-poor, i.e., low X-ray scattering characteristics, support layer would do.

Figure 2:
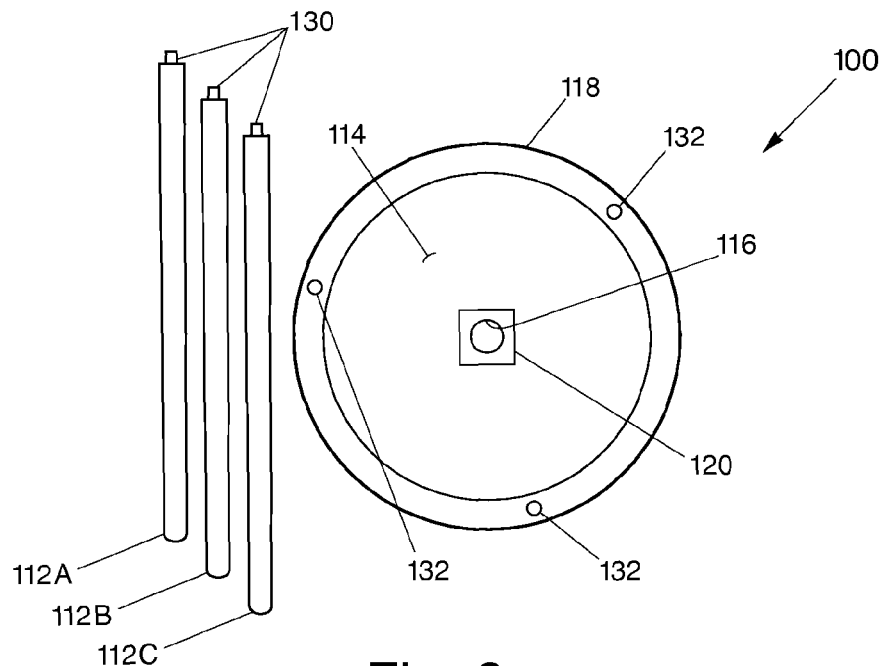
FIG. 2 is a top plan view of the X-ray dosimeter support according to one embodiment of the present invention, after disassembly.

As shown in FIG. 2, in a preferred embodiment, the device 100 is capable of easy disassembly/assembly. The legs are easily removable which makes all the components of the device fit in a "pizza box" like case. In more detail, each of the legs 112A, 112B, 112C is provided with a bolt end-portion that mates with corresponding threaded holes 132 in the frame 118.

Figure 3:
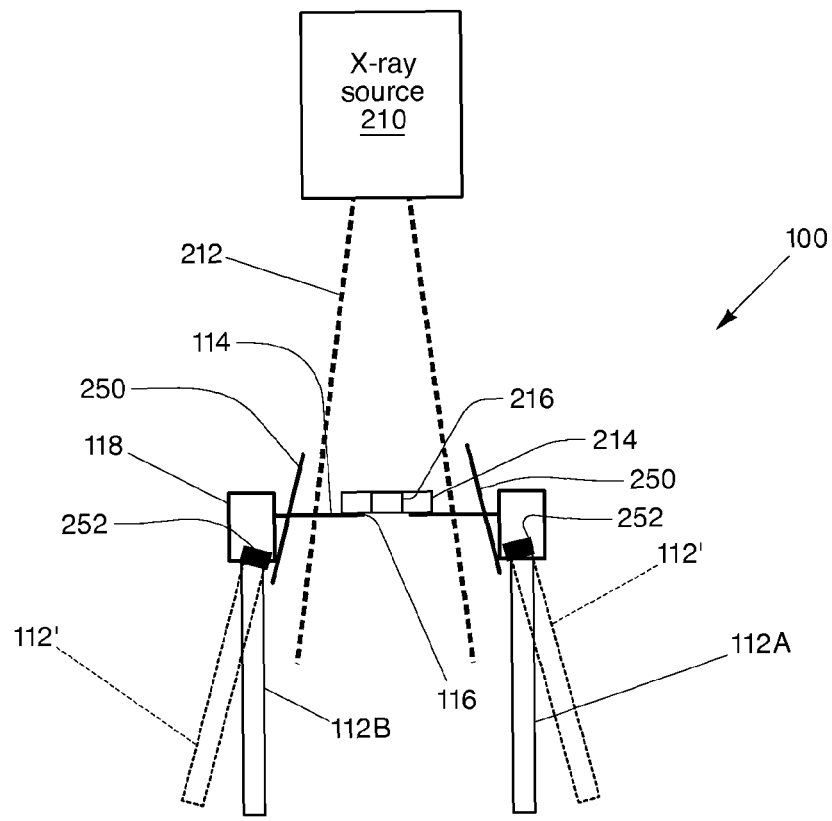
FIG. 3 is a side schematic view of the X-ray dosimeter support showing different embodiments according to the present invention.

FIG. 3 illustrates the use of the support device 100. The device 100 is oriented within the X-ray beam 212 of an X-ray source 210 such that the legs 112A, 112B, 112C and the frame 118 that upholds the support layer 114 are outside the X-ray cone 212 produced by the source 210. The only material interfering with the beam cone 212 is the support layer 114 on which a dosimeter 214 resides. The hole 116 in the support layer 114 has to guarantee that the direct X-rays from the source 210 that pass through the detector cell 216 of the dosimeter 214 are not scattered back to the detector cell 216 by material so close to the detector cell. Since the dosimeter 214 has to be positioned right above the hole 116 in the support layer 114 the X-rays that traverse the dosimeter will travel through free air afterwards to ensure pure direct X-ray measurement. To guide the positioning of the dosimeter the support layer or the frame of the stool can have detection-chamber or X-ray beam centering markers 120 on it (see FIGS. 1 and 2).

Measurements have shown that with this construction the scattering is minimal, and that the results are as good as with any other solution proposed in the prior art. It must be clear from the description that ease of use and repeatability of the tests are superior to those of the solutions in the prior art.

In the current embodiment the device 100 has three legs 112A-112C that give minimal weight and maximal stability.

The invention as described will only give acceptable results if the X-ray cone 212 is collimated in such a way that back-scatter can only come from the support layer 114 of the stool-like device 100. If this condition cannot be satisfied nor guaranteed, extra precautions must be taken, which lead to another embodiment of the invention.

In embodiments in which the material of the stool device 100 is composed will scatter X-rays to the dosimeter 214, the construction of the stool has to be such that this back-scatter is minimal. Therefore, the legs 112A-112C of the stool preferably should be hollow and have an inclination to ensure that any X-ray from the source that directly hits the leg, must travel through the leg over its whole length. Thus, the legs are splayed outward as shown by reference number 112' in this example. This minimizes the impact surface of the leg. To even improve on this, the impact surface of the leg can be shielded by a lead plaquette 252 built into the frame 118 positioned such that there is no straight line from any point in the leg to the source that does not cross the plaquette.

Also the frame 118 of the support layer 114 itself will cause back-scatter. Therefore the material the frame 118 is made of (and that holds the thin membrane on which the dosimeter is positioned) is also preferably shielded by an annular lead ring 250 in such a way that there is no straight line from any point in the frame material 118 to the dosimeter 214 that does not cross the lead ring 250.

The lead ring 250 itself must be constructed as a section of a cone of which the top is the X-ray source to ensure minimal back-scatter from said ring too.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for an X-ray dosimeter support, comprising:
   a material-poor support layer, the support layer being a membrane, a perforated membrane, a fabric, or a mesh;
   a frame to hold the support layer;
   a dosimeter on the support layer; and
   at least one leg to elevate the frame.

2. The apparatus according to claim 1 in which the support layer is equipped with a detection-chamber alignment hole.

3. The apparatus according to claim 1 in which an X-ray entry surface of the frame is equipped with an X-ray shield.

4. The apparatus according to claim 1 in which a sidewall of the frame facing the dosimeter is equipped with an X-ray shield.

5. The apparatus according to claim 4 in which the X-ray shield on the sidewall of the frame is inclined towards the X-ray source.

6. The apparatus according to claim 1 in which the at least one leg is hollow.

7. An apparatus for an X-ray dosimeter support, comprising:
   a material-poor support layer;
   a frame to hold the support layer;
   at least one leg to elevate the frame; and
   detection-chamber or X-ray beam centering markers provided upon the support layer.

8. An apparatus for an X-ray dosimeter support, comprising:
   a material-poor support layer;
   a frame to hold the support layer; and
   at least one leg to elevate the frame, the at least one leg being inclined towards an X-ray source.

9. The apparatus according to claim 8 in which the support layer is a membrane, a perforated membrane, a fabric, or a mesh.

10. The apparatus according to claim 9 in which the frame is equipped with an X-ray shield above the at least one leg.

11. A method for measuring the output of an X-ray source with an X-ray dosimeter, comprising:
    providing a support device for the dosimeter comprising material-poor support layer, a frame to hold the support layer, and at least one leg to elevate the frame, in which the support layer is a membrane, a perforated membrane, a fabric, or a mesh; and
    placing the dosimeter on the support layer in an X-ray beam to measure the beam.

12. The method according to claim 11 in which the support layer is equipped with a detection-chamber alignment hole.

13. The method according to claim 11 in which the X-ray entry surface of the frame is equipped with an X-ray shield.

14. The method according to claim 11 in which the sidewall of the frame facing the dosimeter is equipped with an X-ray shield.

15. The method according to claim 14 in which the X-ray shield on the sidewall of the frame is inclined towards the X-ray source.

16. The method according to claim 11 in which the at least one leg is hollow.

17. The method according to claim 11 in which the at least one leg is inclined towards the X-ray source.

18. The method according to claim 17 in which the frame is equipped with an X-ray shield above the at least one leg.

19. A method for measuring the output of an X-ray source with an X-ray dosimeter, comprising:
    providing a support device for the dosimeter comprising material-poor support layer, a frame to hold the support layer, and at least one leg to elevate the frame;
    providing detection-chamber or X-ray beam centering markers upon the support layer; and placing the dosimeter on the support layer in an X-ray beam to measure the beam.

20. The method according to claim 19 in which the support layer is a membrane, a perforated membrane, a fabric, or a mesh.

* * * * *

UNITED STATES PATENT AND TRADEMARK OFFICE
CERTIFICATE OF CORRECTION

PATENT NO.         : 7,824,103 B2   Page 1 of 1
APPLICATION NO.    : 12/107320
DATED              : November 2, 2010
INVENTOR(S)        : Marc Cresens It is certified that error appears in the above-identified patent and that said Letters Patent is hereby corrected as shown below:

In Claim 10, column 4, line 34, delete "9" and insert --8--.

Signed and Sealed this
First Day of March, 2011

David J. Kappos
*Director of the United States Patent and Trademark Office*